No. 860,578. PATENTED JULY 16, 1907.
L. SHOGRAN.
APPARATUS FOR MANUFACTURING ARTIFICIAL FLOWERS.
APPLICATION FILED MAY 14, 1906.

2 SHEETS—SHEET 1.

Witnesses:
B. C. Hamilton
K. W. Imboden

Inventor,
Leonard Shogran,
by Higdon & Higdon, attys

No. 860,578. PATENTED JULY 16, 1907.
L. SHOGRAN.
APPARATUS FOR MANUFACTURING ARTIFICIAL FLOWERS.
APPLICATION FILED MAY 14, 1906.
2 SHEETS—SHEET 2.
Fig. 3.
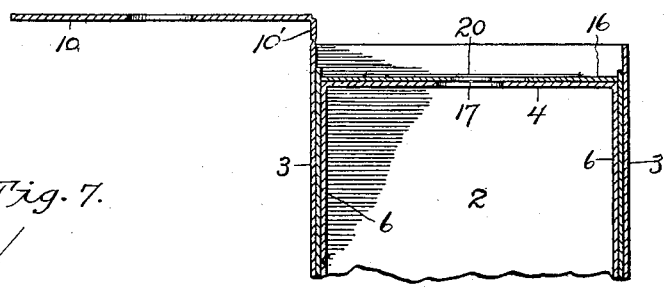
Fig. 7.
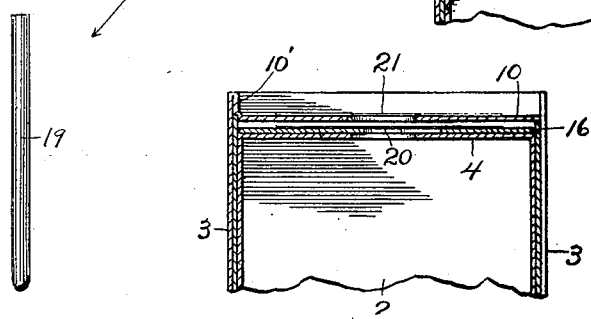
Fig. 4.
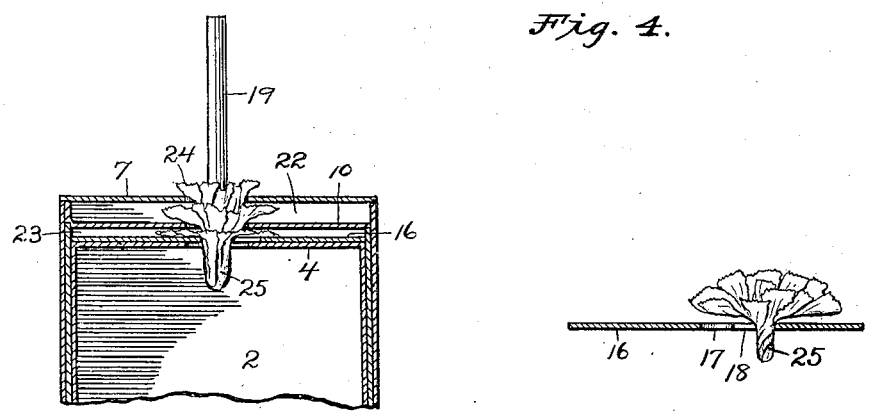
Fig. 5. Fig. 6.
Witnesses:
R. E. Hamilton,
K. W. Inabrden.
Inventor,
Leonard Shogran,
by Higdon & Higdon, attys

UNITED STATES PATENT OFFICE.

LEONARD SHOGRAN, OF KANSAS CITY, KANSAS.

APPARATUS FOR MANUFACTURING ARTIFICIAL FLOWERS.

No. 860,578.     Specification of Letters Patent.     Patented July 16, 1907.

Application filed May 14, 1906. Serial No. 316,683.

*To all whom it may concern:*

Be it known that I, LEONARD SHOGRAN, a citizen of the United States, residing at Kansas City, in the county of Wyandotte and State of Kansas, have invented a new and useful Apparatus for Manufacturing Artificial Flowers, of which the following is a specification.

My invention relates to a device or apparatus for manufacturing certain kinds of artificial flowers, and the object of my invention is to produce a device for this purpose which is simple in construction, easy of manipulation, and occupies a very small space, so that a large number of operators may be accommodated at a single work-bench or table, thereby economizing space.

More specifically, my invention relates to a device for making artificial flowers from ready-prepared disks of the material, which disks may be circular, circulo-scalloped, or circulo-serrated, or of any other configuration suitable for forming a ring of petals for a flower.

Figure 1:
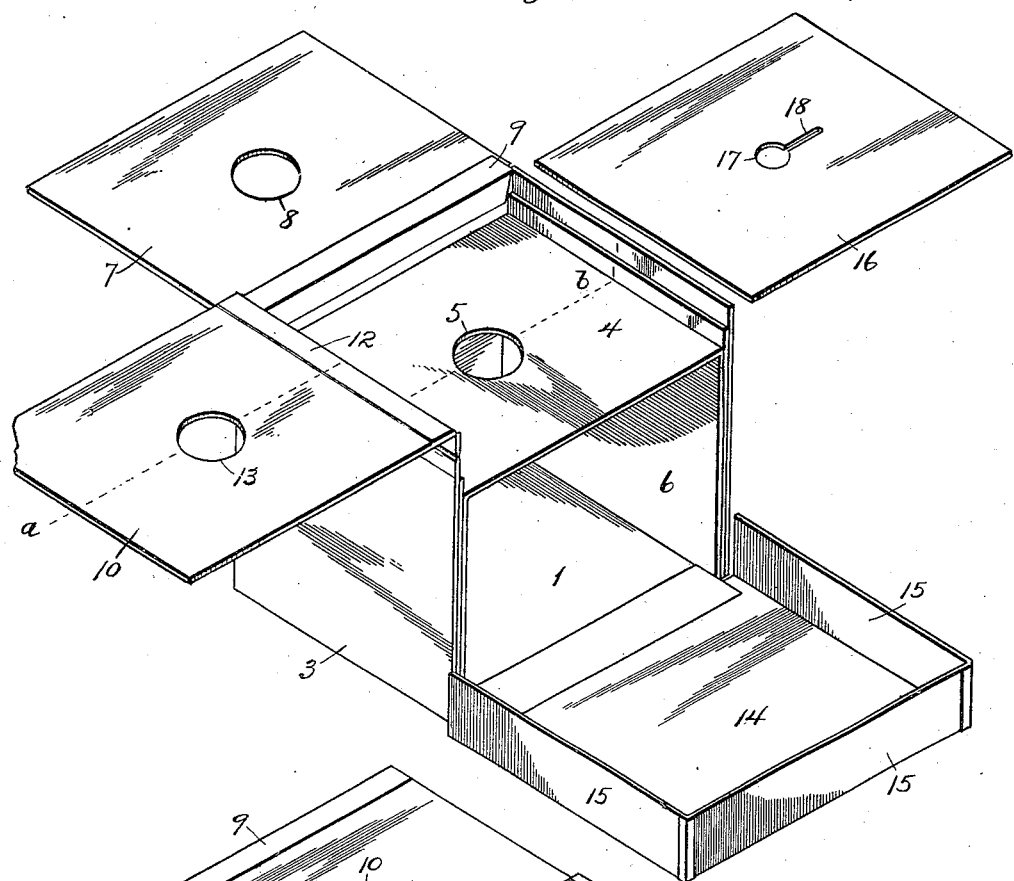
Figure 2:
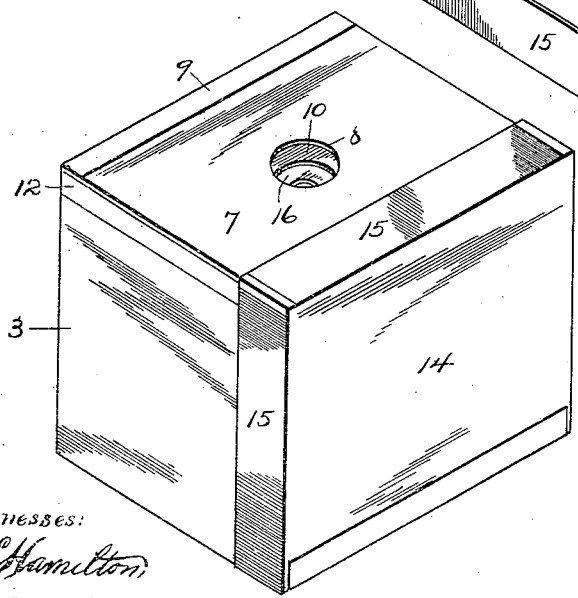

I will now proceed to describe my invention, reference being had to the accompanying drawings, in which:

Figure 1 is a perspective view of an apparatus embodying my invention, one of the forming-plates being shown detached; Fig. 2 is a perspective view of the apparatus with its hinged members in closed position; Fig. 3 is a sectional view taken on line *a—b* of Fig. 1, showing also, the "keyhole" plate and a flower element laid thereon; Fig. 4 is a sectional view similar to Fig. 3, but showing the plate 10 in closed position with a second flower element laid thereon; Fig. 5 is a similar sectional view showing the top plate in closed position, also a partly formed flower, and the plunger which cooperates with the plates to form it; Fig. 6 is a section of the "keyhole" plate showing a flower held by the opening therein; and Fig. 7 is a detached view of the said plunger.

The frame of this device is made preferably in the form of a box, as shown in Fig. 1. By this construction a cavity or receptacle is provided for the disks of material of which the flowers are formed. The box as shown comprises a bottom 1, a back 2, and two sides 3, all rigidly connected together, in connection with the other parts described below. A horizontal plate 4, having a circular aperture 5 therein, is permanently secured across the upper portion of the box, but not at the extreme top thereof. As shown, the lateral edges of this plate are integral with two downwardly-extending flaps 6, which are glued or otherwise secured to the sides 3. But these flaps might be dispensed with, and the plate 4 secured in position by other means. Hinged to the upper edge of the back of the box, is a rectangular plate 7 in which is a circular opening 8, which, when the plate is down (or closed) registers above the opening 5 of plate 4. As shown, the hinge by which the plate 7 is attached consists of a strip 9 of thin flexible material; but metal hinges might be employed in lieu thereof. Hinged to one side 3 of the box, is a plate 10 which is designed to occupy an intermediate position between plates 4 and 7 when in operative position. Its hinge, 12, as shown consists of a strip of thin flexible material. Plate 10 is provided with a circular opening 13, which, when said plate is laid down in the position shown in Fig. 2 or Fig. 4, registers with the openings in the other two plates above described. As shown, these three openings are of substantially equal diameters.

As most clearly shown in Figs. 3 and 4, plate 10 is provided with an integral or rigidly secured lip 10' to which the hinge 12 is attached. The obvious purpose of said lip is to depress the plate 10 when said plate is in closed position, thereby forming a space (22) referred to below. The front side of the box, as shown, is formed of a plate 14, which is preferably hinged to the bottom of the box, and is provided with flanges 15 which lap over the sides and the top plate 7, when closed, as shown in Fig. 2. This hinged front 14 is not essential to the operation of making the flowers, but it provides a means for closing the box when the apparatus is not in use. A third forming-plate is employed, but is made detachable from the box instead of being attached thereto. This plate is marked 16 and is shown in perspective detached in Fig. 1, and in position in Figs. 3, 4 and 5; also in section detached in Fig. 6. As shown, when in position it rests directly upon the bottom plate 4. It is provided with a circular opening 17, of smaller size than the openings in plates 4 and 7, but concentric therewith. This opening 17 is provided with a radial extension or communicating slot 18, the function of which is hereinafter explained.

In combination with the parts just described, a small cylindrical plunger 19, is employed. One end thereof is rounded, as shown. The plunger is of smaller diameter than the opening 17 of "keyhole" plate 16, and its operation is included in the following description of the mode of operating the device. To illustrate this description, reference is had to Figs. 3, 4, 5 and 6. The initial step in forming a flower with this device is to lay back the hinged forming-plate 10 and the hinged forming-plate 7. This exposes the "keyhole" plate 16 in position upon plate 4. A disk of the material, which is preferably paper, is laid upon the plate 16, over its opening 17. In Fig. 3, such a disk is shown, in edge, and designated 20. The other forming-plate 10 is then closed down upon this disk. Next, a similar disk—which may be of the same color or of a different color, from the first—is laid upon plate 10, over its opening 13. This disk is shown in Fig. 4, and designated 21. The hinged forming-plate 7 is now closed. A space 22 is provided between this plate and the plate below, as shown in Fig. 5. Also, a lesser space 23 is provided between the hinged plate 10 and the "keyhole" plate 16. Said spaces permit of the crimping and proper shaping of the material into the form of a flower, when acted upon by the plunger. A third disk, 24, is laid upon the top plate 7, over its opening 8. The plunger 19 is now taken by the operator and (with blunt end down) is forced downwardly upon the disks, drawing the central portion of each one down through the respective holes in the plates, until the material assumes the form shown in Fig. 5. The disks shown in the drawing were cut with serrated edges to imitate the petals of a carnation or "pink." As clearly shown, the calyx 25 is formed by the protuberance caused by the terminal portion of the plunger. The plunger is now withdrawn, the calyx is grasped by the thumb and forefinger of one hand, and with the other hand the hinged plates 10 and 7 are turned back. The flower is not torn by this operation. The "keyhole" plate 16 is removed from the box, and the calyx is slipped laterally into the slot or extension 18 of opening 17, as shown in Fig. 6; the purpose of which is to permit the operator to twist the calyx without grasping the petals. The upper portion of the calyx, adjacent the petals, is prevented, by the slot, from turning, while the calyx itself is sufficiently twisted by the thumb and forefinger of the operative. If suitable material is used, this twist will be retained. The object of the twisting is to reduce the calyx to a proper size and firmness and to bind the three component parts more firmly together. The flower is now complete, excepting a stem, and is removed from the plate 16, and the above-described operation is repeated for the next flower.

Having described my invention, what I claim as new and desire to secure by Letters Patent, is:

1. An apparatus for manufacturing artificial flowers, comprising a plurality of horizontally-disposed forming-plates having registering openings therein, and spaced apart, and means for supporting said plates, in combination with a plunger not connected thereto.

2. An apparatus for manufacturing artificial flowers, comprising a plurality of horizontally-disposed forming-plates having registering openings therein, and spaced apart, means for supporting said plates, said plates being movable relatively to said supporting means, in combination with a plunger not connected thereto.

3. An apparatus for manufacturing artificial flowers, comprising an upper forming-plate having an opening therein, an intermediate forming-plate having an opening therein, and a lower forming-plate having an elongated opening therein, said plates being spaced apart, and means for supporting said plates; all of said plates being movable relatively to said supporting means.

4. An apparatus for manufacturing artificial flowers, comprising an upper forming-plate having a circular opening therein, an intermediate forming-plate having a circular opening therein, and a lower forming-plate having an elongated opening therein, said plates being spaced apart, and means for supporting said plates; said plates being movable relatively to said supporting means.

5. An apparatus for manufacturing artificial flowers, comprising a box, an upper forming-plate hinged thereto and having an opening therein, an intermediate forming-plate hinged thereto and having an opening therein, a lower forming-plate having a keyhole-shaped opening therein, and means for supporting said lower forming-plate.

6. An apparatus for manufacturing artificial flowers, comprising a box, an upper forming-plate hinged thereon and having an opening therein, an intermediate forming-plate hinged thereon and having an opening therein, a lower forming-plate having a keyhole-shaped opening therein, a supporting plate having an opening which registers with, and exceeds in diameter, the said opening in said lower forming-plate.

7. An apparatus for manufacturing artificial flowers, comprising a box, a fixed supporting plate within the box, said plate having an opening therein, a detachable forming-plate supported thereby and having a keyhole-shaped opening therein, a removable forming-plate spaced above the lower forming-plate and having an opening therein, and an uppermost removable forming-plate having an opening therein and spaced above the last-mentioned or intermediate forming-plate.

8. An apparatus for manufacturing artificial flowers, comprising a box, a fixed supporting plate therein, said plate having an opening therein, a detachable forming-plate supported thereby and provided with a keyhole-shaped opening, a hinged intermediate forming-plate spaced above the lower forming-plate and having an opening therein, and an uppermost hinged forming-plate having an opening therein and spaced above said intermediate forming-plate.

9. An apparatus for manufacturing artificial flowers, comprising a box, a fixed supporting plate within the box, said plate having a circular opening therein, an intermediate forming-plate and an upper forming-plate, each having a circular opening therein, a lower detachable forming-plate having a circular opening of less diameter than the openings of the other said plates, said circular opening having a narrow extension or slot which is adapted to engage the calyx of the artificial flower while the calyx is being twisted by the operative.

10. An apparatus for manufacturing artificial flowers, comprising a box, the forming-plates hinged thereto, said plates being provided with the openings 8 and 13, the fixed supporting-plate 4, provided with an opening 5 which registers with the aforesaid openings, and the detachable forming-plate 16, adapted to rest upon the said plate 4, said plate 16 being provided with a circular opening 17 having a narrow extension 18; for the purpose set forth.

In testimony whereof I affix my signature in the presence of two witnesses.

LEONARD SHOGRAN.

Witnesses:
K. M. IMBODEN,
G. E. WOODCOX.